United States Patent Office 3,428,024
Patented Feb. 18, 1969

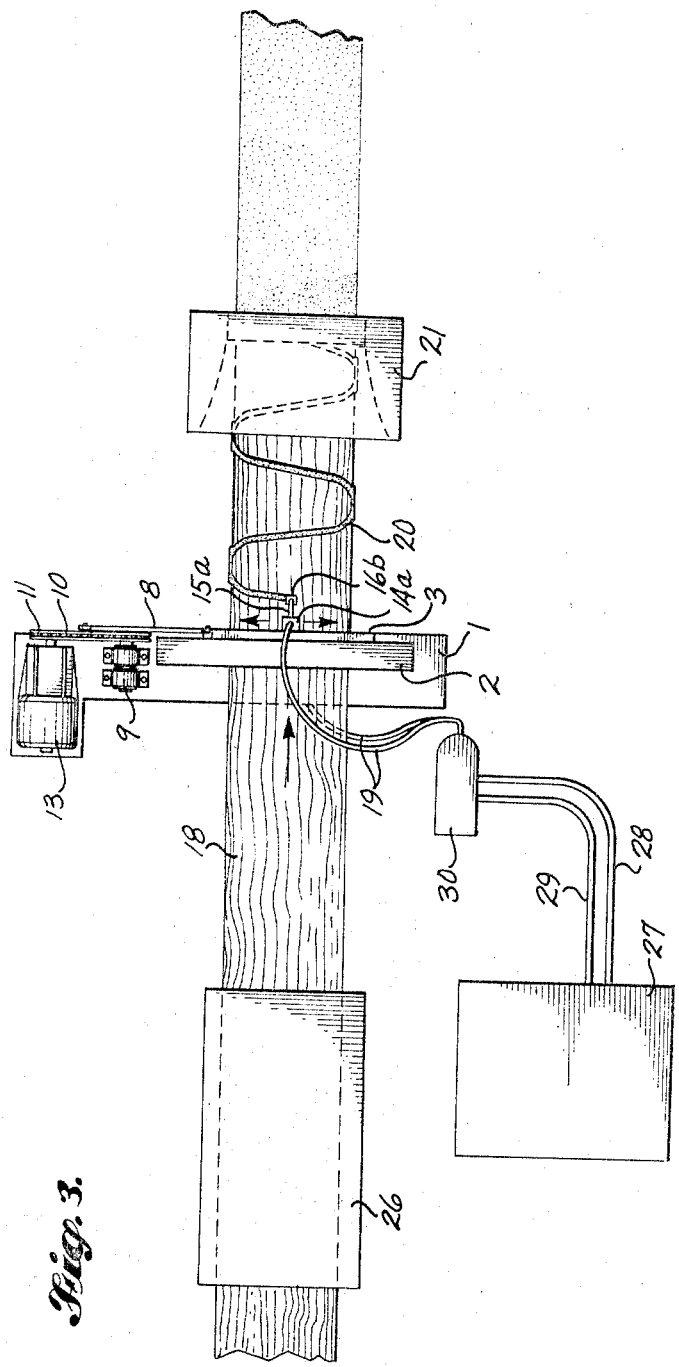

3,428,024
APPARATUS FOR APPLYING AND SPREADING A COATING ON A CORE MATERIAL
Katashi Oita, Seattle, and Darrell E. Pierson, Federal Way, Wash., James N. Ottaway, Saratoga, Calif., and Richard W. Caster, Seattle, Wash., assignors to Weyerhaeuser Company, Tacoma, Wash., a corporation of Washington
Filed Sept. 27, 1967, Ser. No. 671,068
U.S. Cl. 118—125     5 Claims
Int. Cl. B05c 11/02

ABSTRACT OF THE DISCLOSURE

An apparatus for uniformly applying a coating composition to a portion of or all of the surfaces of a core material, the apparatus including an oscillating applicator which applies a bead of coating composition on the core material as it travels through the apparatus in a sinusoidal manner and a spreader which smooths the bead of coating and spreads it uniformly over the surface of the core material.

Background of the invention

In an effort to upgrade lumber and other cellulosic products, the wood-products industry has turned toward coating of these core materials with various plastics to provide the core materials with increased weather resistance, decorative appearance, and durability. To economically envelop lumber or other core material in a plastic envelope, a process must be continuous and operable at fairly rapid rates of speed.

To bound a plastic coating to a core material, an adhesive is usually applied to the core material prior to application of the plastic coating. It has been difficult to apply a smooth, uniform adhesive film to one or all of the surfaces of a core material in one pass on a continuous basis at relatively high rates of speed for a number of reasons. The adhesive used must be fairly highly reactive in order to enable bonding of the plastic to the core material in a short period of time. When highly reactive adhesives are used, however, a self-cleaning system is necessary. Also, highly reactive adhesives are frequently high viscosity adhesives and standard applicator equipment, such as multiple spray nozzles, have not been found to be suitable. The small diameter nozzles and multiple feed channels used with most conventional spray equipment are hard to keep unplugged even while the adhesive is flowing. when a nozzle plugs, the film applied to the core material is, of course, non-uniform and even void in places.

Roll coaters have also been used to apply adhesives to various core materials but these have also been found not to provide a uniform adhesive spread, particularly to lumber and other core materials which are non-uniform due to cupping, twisting or warping. Hard metal rolls, because of cupping and low spots in lumber, are also not capable of providing a uniform adhesive spread. On the other hand, soft roll coaters which are soft enough to follow the board surface tend to build up excessive adhesive pockets in the foam sponge causing an uneven adhesive spread on the core material.

All of these disadvantages are alleviated by the present invention which is capable of applying a uniform adhesive film to a core material which need not be uniform in nature. That is, the process can utilize standard lumber products which are produced within established manufacturing and grade size tolerances. The equipment can tolerate core materials whose surfaces vary up to one-fourth of an inch away from the mean center of the core surface without consequence. This same equipment can also be used to coat lumber and other materials with various coating compositions other than adhesives.

Summary of the invention

This invention relates to an apparatus for applying a uniform film of an adhesive composition or other coating composition to one or more surfaces of a core material. Particularly, this invention relates to the combination of an oscillating applicator and a spreading means capable of applying a uniform coating to one or more surfaces of a core material.

In its broadest aspects, the apparatus of this invention comprises in combination (1) a supporting frame, (2) an adhesive applicator movably mounted on the supporting frame and adapted to deposit a bead of a coating composition to one or more surfaces of a core material moving past the applicator, (3) power means connected to the applicator for oscilating the applicator between a first and second position so as to apply the bead of coating composition over the width of the core material, and (4) spreading means positioned adjacent the applicator. The spreader comprises a frame within which is attached a flexible liner having dimensions somewhat smaller than the cross section of the core material to be coated. Adjustable pressure means are mounted around the flexible liner where it contacts the core material so as to allow adjustment of the pressure exerted on the respective surfaces of the core material in order to control the amount of coating composition applied and to evenly and uniformly spread the bead of coating composition.

Brief description of the drawings

FIGURE 3 is a top elevational view of the over-all schematic of the combination applicator-spreader of the instant invention.

Detailed description of the drawings

Figure 1:
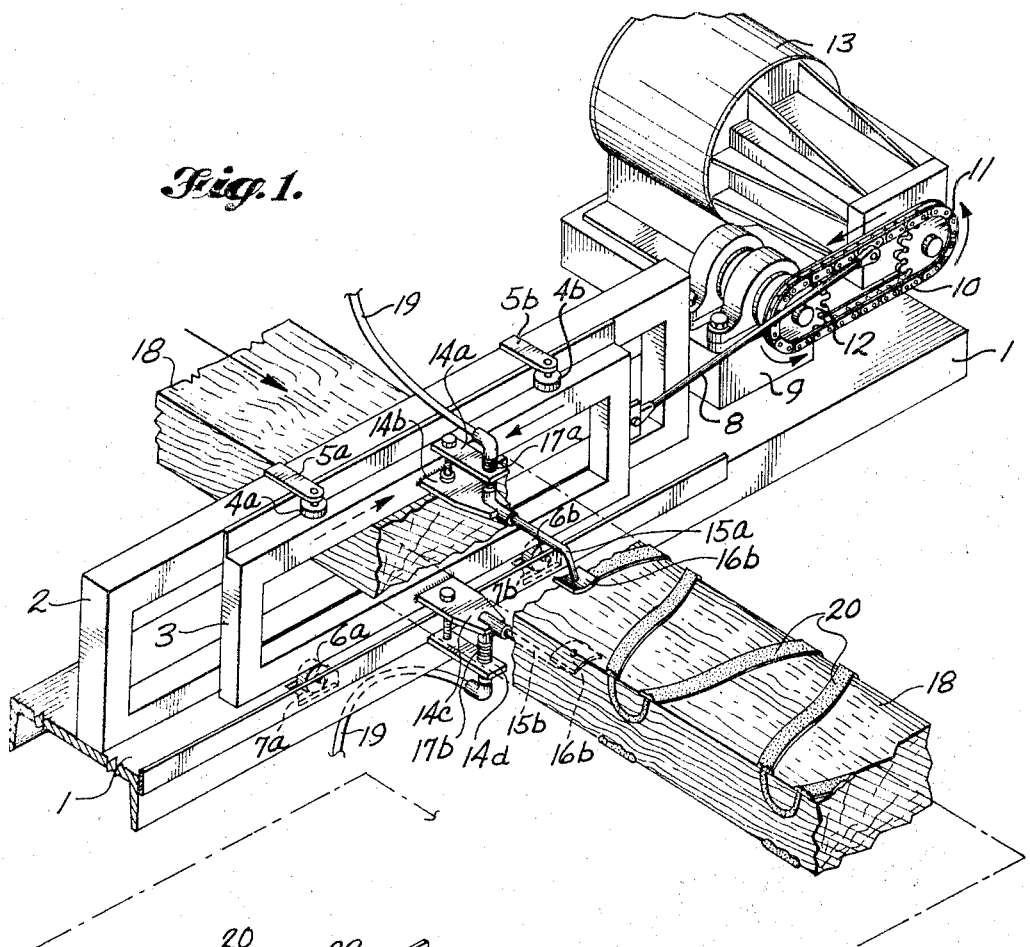
FIGURE 1 is a perspective view of the oscillating adhesive applicator of the present invention.
Figure 2:
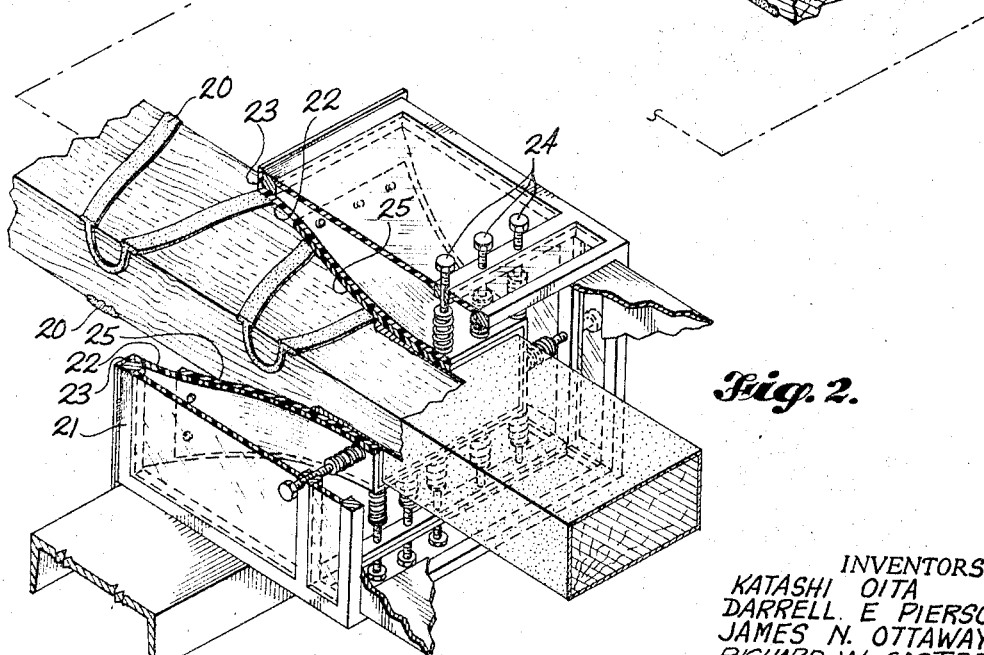
FIGURE 2 is a perspective view of the spreader of the present invention.

Referring now to FIGURE 1, the drawing shows a perspective view of the oscillating applicator of the present invention. On supporting beam 1 is mounted at right angles thereto a guide frame 2. Directly adjacent guide frame 2 is mounted oscillating frame 3 held in place by rollers 4a and 4b attached to guide frame 2 by supporting elements 5a and 5b. Oscillating frame 3 is free to move back and forth by means of rollers 4a and 4b and rollers 6a and 6b which are mounted in channels 7a and 7b. The height and width of the frame members 2 and 3 may be of any dimension depending on the material to be coated. The design of the particular applicator is such that a great deal of variation in the size of the core material can be accommodated using the same equipment.

To oscillating frame 3 is attached linkage 8 which is attached at its other end to roller chain 10. Roller chain 10 is mounted on sprockets 11 and 12 which are connected to pillow blocks 9 and and variable speed motor 13, respectively.

Nozzles 15a and 15b are secured to oscillating frame 3 by means of supporting elements 14a, 14b, 14c, and 14d. The nozzles 15a and 15b have a plate 16a and 16b, respectively, which functions to flatten the bead of coating composition exuded from the nozzles. The nozzles 15a and 15b are connected to carrying tubes 19, preferably of a non-sticking and non-corroding material such as polytetrafluoroethylene. The nozzles are preferably spring loaded (17a and 17b). The flexibility of nozzles 15a and 15b enables them to travel with the core material should any unevenness be encountered in movement of the core material through the applicator. The nozzles are mounted so that their delivery ends contact the top and bottom of the core material which, as shown, is a piece of dimension lumber. The variable speed motor 13 can be set at any speed and thus change the frequency of the sine wave of the coating composition applied to the core material traveling therethrough. The rate of speed at which the core material travels through the applicator and the rate the coating composition is delivered will control the amount of coating composition applied. The nozzles 15a and 15b are adjusted to oscillate over the width of the material to be coated. The nozzles can be allowed to go a bit beyond the edge of the core material so that a quantity of coating composition is applied to the sides of the core material, should this be desired. The equipment of this invention can be used to apply a coating to one, two, or four surfaces of core material moving therethrough. The coating applied to core material 18 is in the form of a bead 20 applied in a sine wave configuration because of the movement of the core material 18 through the applicator and the oscillatory movement of the applicator nozzles by frame 3.

After the core material 18 has been coated, it is moved through a spreader which smoothes the bead and spreads it uniformly over the entire surface of the core material desired to be coated. The spreader comprises a frame 21 to which a flexible liner 22 is attached at 23. The semi-rigid liner 23 is of a suitable, tough plastic material such as high impact polystyrene or acrylonitrilebutadiene-styrene polymers. The nozzle opening of liner 22 is approximately the same size as the core material moving therethrough. A second flexible liner 26 is attached to flexible liner 22. This second liner, preferably a polyvinylchloride plastisol, exerts a constant pressure on the surfaces of core material 18 moving through liner 22 and stretches to fit the core material pattern moving therethrough. Slots about three inches deep are made in the four corners of liner 22. Around the four sides of liner 22 are mounted spring-loaded adjustment screws 24. These adjustment screws can be adjusted to increase or decrease the pressure exerted by liner 22 on the second plastisol liner 26. By suitable adjustment of the adjustment screws 24, the amount of coating composition, adhesive or otherwise, applied to core material 18 can be closely controlled because liner 26 acts as a "squeegee." Uniform pressure on the flexible, plastisol liner can also be exerted by hydraulic or pneumatic means. The amount of adhesive or other coating composition remaining on the core material after passing through the spreader is controlled by the cohesion of the composition to the core material, the viscosity of the adhesive and the pressure on liner 26. The flexible liners 22 and 26 have sufficient flexibility to adjust to varying sizes of core material moving therethrough and particularly to non-uniformities in standard lumber material. During operation, the plastisol liner 26 exerts a pressure on all of the surfaces of core material 18 and, to some extent, is stretched through flexible liner 22 when core material 18 is traveling at a relatively high rate of speed.

The operation of the apparatus of this invention can be best described by reference to FIGURE 3 which shows a piece of core material 18 passing through a preheater 26 and subsequently through an adhesive applicator and spreader. The function of preheater 26 is to lower the viscosity of the adhesive or other composition to facilitate spreading, to speed the curing rate when using an adhesive, and to remove moisture from the surface of the core material. Reference numeral 27 denotes a metering machine for metering a resin and catalyst through feed lines 29a and 29b respectively to mixing head 30 wherein the resin components are mixed together and passed through lines 19 to applicator nozzles 15a and 15b. The bead of adhesive is spread on the moving core material 18 in a sinusoidal manner. Subsequently the adhesive bead is spread to a uniform coating by the spreader. Utilizing the apparatus of this invention a suitable piece of core material can be spread with a uniform coating of adhesive at speeds ranging from 10–35 feet per minute and even as high as 100–200 feet per minute, should such speeds be desired.

The apparatus of this invention is preferably used in conjunction with the variable extruder die described in U.S. Patent No. 3,323,172, assigned to the assignee of the present application.

Any suitable adhesive for bonding a plastic material to a cellulosic core material can be used. Preferably reactive, multicomponent polyurethane or epoxy adhesives are used, for these adhesives have both the requisite fast curing rates and bonding qualities.

The apparatus heretofore described can also be used to coat core materials with coating compositions other than adhesives for many of the problems associated with spreading high viscosity, reactive coatings are the same as for highly reactive adhesive compositions.

Core materials such as common grade lumber, solid or expanded foam plastic core materials, particleboard, hardboard, plywood, laminated products, metals, plastics, etc., can be coated with the apparatus of this invention. The adhesive applied to the desired surfaces of the core materials holds the plastic envelope, which is later applied, in place and prevents blistering of the coating when changes in temperature cause expansion or contraction of the plastic after the product is in use. When wood or paperbased core materials are enveloped in plastic by suitable means and the ends capped and sealed, change in the core dimension due to gain or loss of moisture is prevented.

What is claimed is:

1. An apparatus for applying a uniform film of a high viscosity adhesive to all the surfaces of a core material passing therethrough which comprises in combination,
   (1) applicator means adapted to deposit a bead of adhesive on the core material, the applicator means comprising a pair of opposed nozzles located above and below the core material and in contact therewith,
   (2) power means connected to the applicator means for oscillating the applicator means in a direction normal to the movement of the core material between a first position extending just beyond the edge of the core material and a second position extending just beyond the opposite edge of the core material so as to apply a bead of adhesive over the top, bottom, and side surfaces of the core material,
   (3) spreading means positioned ahead and in line with the applicator means comprising
      (a) a frame surrounding the core material,
      (b) a flexible liner surrounding the core material and attached at one end to the frame, the opposite end of the flexible liner having an opening of similar configuration to the core material and having dimensions smaller than the cross section of the core material so that the bead of adhesive is uniformly spread over the surfaces of the core material at it is moved therethrough.

2. Apparatus according to claim 1 wherein the spreading means includes a plurality of spring-loaded adjustable pressure means in contact with the flexible liner where it contacts the core material and mounted around the frame at spaced intervals, allowing adjustment of the liner pressure on the surfaces of the core material moving therethrough.

3. Apparatus according to claim 1 wherein the opposed nozzles are spring-loaded enabling them to travel over irregularities on the surfaces of the core material.

4. Apparatus according to claim 1 wherein the flexible liner has attached thereto a polyvinyl chloride plastisol liner in contact with the core material.

5. An apparatus for applying a uniform coating of a high viscosity adhesive simultaneously to all the surfaces of a moving core material which comprises,
   (1) a guide frame, (2) a second frame movably mounted within the first guide frame and parallel thereto, the second frame of a configuration such as to surround the core material moving therethrough.
(3) a pair of opposed adhesive applicator nozzles mounted on the second frame above and below the core material and a distance apart such that the moving core material can travel therebetween in contact with the delivery end of the nozzles,
(4) means connected to the applicator nozzles for delivery of adhesive thereto,
(5) power means connected to the second frame for oscillating the second frame and adhesive applicator nozzles attached thereto between a first position extending just beyond the edge of the core material and a second position extending just beyond the opposite edge of the core material so as to apply a bead of adhesive to the top, bottom, and side surfaces of the core material,
(6) spreading means positioned ahead and in line with the applicator means comprising
   (a) a frame surrounding the core material of a size such that the core material can freely move therethrough,
   (b) a flexible liner surrounding the core material mounted on the frame and attached thereto at one end, the opposite end of the liner having an opening of similar configuration to the core material and having dimensions smaller than the cross section of the core material so that the bead of adhesive thereon is uniformly spread over the surfaces of the core material as the core material is moved therethrough, and
   (c) a plurality of spring-loaded adjustable pressure means mounted around the end of the liner in contact with the core material and attached to the frame allowing adjustment of pressure on the respective surfaces of the core material to control the amount of adhesive applied thereto.

References Cited

UNITED STATES PATENTS

| | | | |
|---|---|---|---|
| 19,316 | 2/1858 | Thayer et al. | |
| 658,427 | 9/1900 | Cermak | 118—125 |
| 1,375,979 | 4/1921 | Taber. | |
| 1,727,929 | 9/1929 | Berssenbrugge | 118—125 |
| 1,812,854 | 7/1931 | Beach | 118—323 |
| 2,896,569 | 7/1959 | Ferguson et al. | 118—3 |
| 3,135,628 | 6/1964 | Johnson et. al. | 118—3 |
| 3,166,440 | 1/1965 | Carmichael et al. | |
| 3,183,887 | 5/1965 | Derderian | 118—3 |
| 3,299,854 | 1/1967 | Van Loben Sels | 118—411 |
| 2,878,522 | 3/1959 | Locke | 118—410 X |

WALTER A. SCHEEL, *Primary Examiner.*

JOHN P. McINTOSH, *Assistant Examiner.*

U.S. Cl. X.R.

118—411